April 26, 1960
G. L. STEVENS
2,934,312
THRUST COMPENSATING DEVICE FOR AXIALLY
INCLINED BUTTERFLY VALVES
Filed Oct. 29, 1957
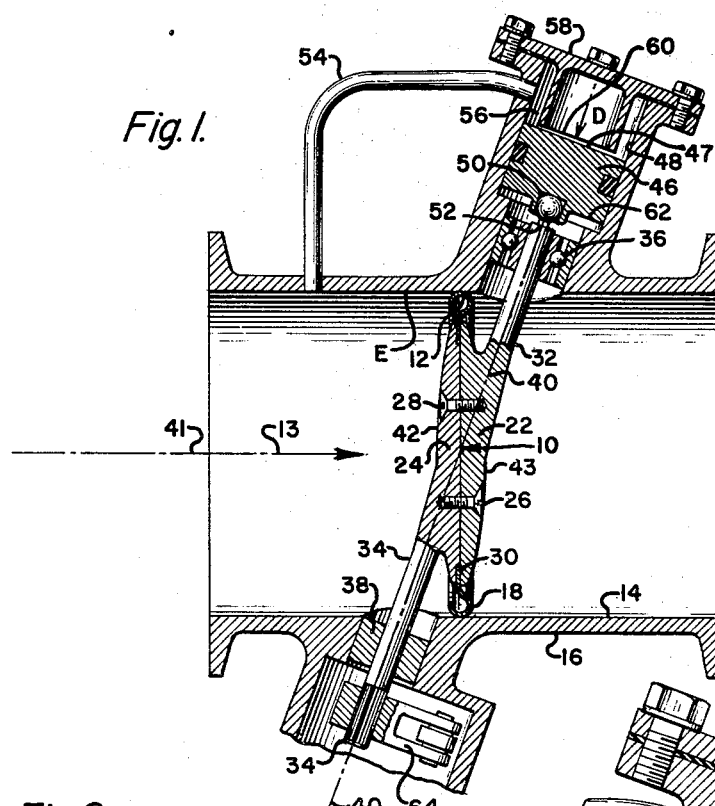
Fig. 1.
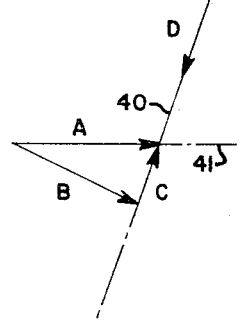
Fig. 4.
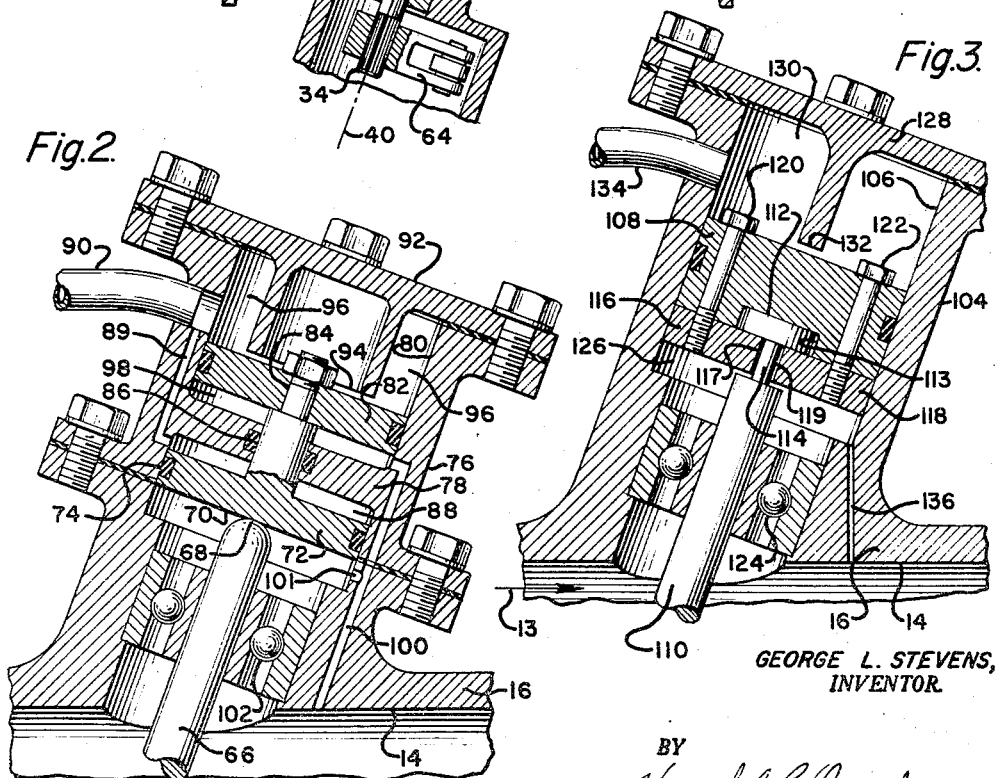
Fig. 2.
Fig. 3.
GEORGE L. STEVENS,
INVENTOR.
BY
Herschel C. Omohundro
attorney

United States Patent Office 2,934,312
Patented Apr. 26, 1960

2,934,312

THRUST COMPENSATING DEVICE FOR AXIALLY INCLINED BUTTERFLY VALVES

George L. Stevens, Mesa, Ariz., assignor to The Garrett Corporation, Los Angeles, Calif., a corporation of California Application October 29, 1957, Serial No. 693,095

10 Claims. (Cl. 251—283)

The present invention relates to a thrust compensating device for axially inclined butterfly valves, and more particularly to a device which employs fluid pressure to oppose thrust acting longitudinally of the pivotal axis of an axially inclined butterfly valve.

The term "axially inclined butterfly valve" as used herein, is intended to define a disc-shaped butterfly valve element, pivotally mounted in a valve bore, on an axis which is inclined at an angle other than 90 degrees, to the valve bore axis, and to opposite sides of the butterfly valve element. Further, the term "axially inclined butterfly valve" may define a disc-shaped butterfly valve element pivotally mounted on an axis disposed at an angle other than 90 degrees, relative to an axis extending through the center of the butterfly valve element and disposed normal to opposite sides thereof.

An axially inclined butterfly valve element, when subjected to a fluid pressure differential thereacross, tends to move laterally of a bore in which it is pivotally mounted, and to cause excessive friction and wear at the contacting surfaces of the butterfly valve element and the bore.

An axially inclined butterfly valve element having a flexible rim is sometimes adversely affected by forces which tend to deflect the rim laterally of the bore in which it operates. Such deflection at the rim of a butterfly valve element may cause excessive leakage therearound. In addition, lateral forces acting on a butterfly valve element may cause undue friction between it and a fluid-conducting bore in which the valve element operates, thereby causing resistance to the movement of the butterfly valve element. Furthermore, thrust which is directed longitudinally of the pivotal axis of an axially inclined butterfly valve element imposes an undesirable axial load on bearings which support the butterfly valve element.

Accordingly, it is an object of the present invention to provide a thrust compensating device, for axially inclined butterfly valves, which opposes thrust exerted longitudinally of the pivotal axis of a butterfly valve element, thereby substantially alleviating uneven peripheral contact pressure between the rim of the butterfly valve element and the bore in which it operates, whereby the valve element seats concentrically in the bore and moves therein with a minimum of friction when the valve element is in or near a closed position.

Another object of the invention is to provide a device which substantially alleviates axial thrust loads on supporting bearings of an axially inclined butterfly valve element.

Another object of the invention is to provide a device which minimizes friction attendant to the operation of an axially inclined butterfly valve element, whereby such a valve element may very easily and accurately be modulated by an automatic control device.

An additional object of the invention is to provide a device which tends to minimize wear attendant to the operation of axially inclined butterfly valves.

A further object of the invention is to provide a device which substantially compensates for thrust imposed axially of an axially inclined butterfly valve element when a pressure differential acting on the valve element is imposed in either of two opposite directions.

A still further object of the invention is to provide a thrust compensating device which is particularly adapted for use in connection with axially inclined butterfly valves having flexible peripherally disposed sealing rims, whereby undue radial deflection and attendant leakage of such flexible rims may be substantially alleviated.

Other objects and advantages of the invention may be apparent from the following specification, appended claims and accompanying drawings, in which:

Figure 1 is an axial sectional view of an axially inclined butterfly valve provided with a thrust compensating device constructed in accordance with the present invention;

Fig. 2 is a fragmentary axial sectional view of a modified form of the thrust compensating device according to the present invention;

Fig. 3 is a fragmentary axial sectional view of a further modification of the invention; and Fig. 4 is a graphic illustration of forces attendant to the operation of the present invention.

As shown in Fig. 1, a butterfly valve element 10 is provided with a flexible, peripherally disposed rim 12, which seats in a bore 14 of a housing 16. The flexible rim 12 is similar to that disclosed in the patent application of Raymond W. Jensen, Serial No. 339,128, filed April 30, 1953, now Patent No. 2,816,729, dated December 17, 1957. The rim 12 at its periphery 18 intimately engages the bore 14 in order to shut off or modulate the flow of fluid through the bore as desired. The valve 10 is disposed in the bore 14 to control fluid normally tending to flow in the direction indicated by an arrow 13.

The butterfly valve element 10 is provided with a pair of circular or disc-shaped plates 22 and 24, clamped together by screws 26 and 28, which hold the plates securely on opposite sides of an inwardly extending flat annular portion 30 of the rim 12. Integral with the plates 22 and 24 are shaft sections 32 and 34 respectively, which are supported in the housing 16 by means of respective bearings 36 and 38. It will be noted that the disc-shaped butterfly valve element 10 may be otherwise constructed; for example, a single shaft may be used in place of two separate shaft sections, and the single shaft may be connected to a one-piece disc structure if desired, as illustrated in the Jensen application referred to above. As shown in Fig. 1 of the drawing, the bearings 36 and 38 are aligned on a common axis 40, which extends through the shaft sections 32 and 34 of the butterfly valve plates 22 and 24.

As shown in Fig. 1, the common axis 40 of the bearings 36 and 38 is inclined at an angle other than 90 degrees, relative to an axis 41 of the bore 14. It will be noted that upstream and downstream sides 42 and 43, respectively, of the butterfly valve element are disposed substantially normal to the bore axis 41 and at an angle other than 90 degrees to the pivotal axis 40 of the butterfly valve element. It will also be noted, however, that opposite sides of the butterfly valve element may be slightly abnormous to the axis 41.

Pressure fluid flowing through the bore 14 creates a pressure differential across the valve element 10, and the total force of such a pressure differential is illustrated by a vector A of the force triangle graphically disclosed in Fig. 4 of the drawing. The vector A is assumed to be directed along the axis 41 toward and normal to the upstream side 42 of the butterfly valve element 10. Due to the axial inclination of the bearings 36 and 38, relative to the opposite sides of the butterfly valve element, the total force represented by the vector A may be divided into separate components of the force; namely, those acting in the directions of vectors B and C of the force triangle. The vector B of the triangle is disposed to indicate the magnitude of force acting toward and at right angles to the bearing axis 40 of the butterfly valve element 10, while the vector C graphically illustrates the magnitude of the force directed axially of the axis 40 toward the bearing 36, all of which is well known in the art of axially inclined butterfly valve design.

The thrust compensating device of the present invention applies force, in the direction of an arrow D, equal and opposite to the component of force graphically represented by the vector C, and thereby prevents this component of force from causing deflection of the flexible rim 12 at its periphery 18 radially in one direction against the side E of the bore 14. Thus, balancing of the thrust component C by a thrust compensating force, acting in the direction of the arrow D, prevents the periphery 18 from being highly loaded against the side E of the bore 14, thereby alleviating undue friction and wear during pivotal movement of the butterfly valve element 10 in the bore 14.

The thrust compensating device of the present invention, as shown in Fig. 1 of the drawings, employs a piston 46, movably mounted in a cylinder bore 48, and engaging a thrust bearing 50, which bears on end 52 of the shaft 32. A conduit 54 communicates with the bore 14 at the upstream side 42 of the butterfly valve element 10, and is disposed to deliver fluid under pressure into section 56 of the cylinder bore 48 at one end 47 of the piston 46. The cylinder 48 is provided with a cap 58, closing the end of the cylinder bore 48, and projecting into the cylinder 48 from the cap 58 is a stop element 60 disposed to prevent undue movement of the piston 46 in the cylinder bore 48, as will be hereinafter described in detail.

It will be seen that the bearing 36 may be of the ball, sleeve or roller type, and that the bearing 36 may have sufficient open space to permit the passage of fluid therethrough, whereby fluid pressure from the bore 14, downstream of the valve element 10, may be applied to the piston 46. If the bearing 36 is closely fitted to the shaft 32 and does not provide a fluid passage within itself, a separate passage may be provided, as will be hereinafter disclosed in a description of the modification shown in Fig. 3 of the drawings. This arrangement prevents pressure fluid, which may leak from the chamber 56 and past the piston 46, from accumulating at the end 62 of the piston 46, and exceeding fluid pressure at the downstream side 43 of the valve element, which pressure is normally less than that at the upstream side 42 of the valve element 10.

During normal operation of a butterfly valve, the force represented by vector C, as shown in Fig. 4 of the drawings, is greatest when the valve element 10 is in its closed position. This condition is due to the fact that a pressure differential across the valve element is greatest when the valve element is in closed position.

Connected to the shaft 34 is a bell crank 64, which may be coupled to any desirable actuating device for pivoting the butterfly valve 10 about its axis 40.

In operation, the thrust compensating device of the present invention balances thrust forces exerted longitudinally of the axis 40, thereby preventing such thrust forces from creating undue pressure between the periphery 18 of the flexible rim 12 and the side E of the bore 14. This action prevents excessive friction and radial loading of the flexible rim 12, whereby the butterfly valve may be readily opened and closed and may easily be modulated by an automatic device.

It will be understood that periphery 18 of the butterfly valve element 10 frictionally engages the bore 14 when moving into and out of closed position. It is desirable that such frictional engagement be uniform around the entire periphery of the valve element 10 without the existence of more radial force in one direction than another, which would tend to cause uneven loading and consequent deformation of the flexible rim, and permit leakage therearound.

It will be seen that when fluid pressure, at the upstream side 42 of the butterfly valve element 10, is greater than fluid pressure at the downstream side 43 thereof, a pressure differential on the butterfly valve element acts in a direction as indicated by the arrow 13. Fluid pressure at said upstream side 42 also communicates with the conduit 54, which delivers such pressure fluid into the chamber 56. The force of pressure fluid in the chamber 56 acts on the piston 46 in opposition to a lower pressure at the end 62 thereof, thereby creating a pressure differential on the piston 46, tending to move it in the direction of the arrow D.

The area of the piston 46 is sized in proportion to the diameter of the butterfly valve element 10, and in accordance with the angle at which the pivotal axis 40 of the valve element is disposed, relative to the opposite sides of the valve element. This arrangement is such that the force transmitted by the piston 46, to the thrust bearing 50, in the direction of the arrow D, always substantially equals the force component, as represented by the vector C in Fig. 4 of the drawing, thereby automatically balancing thrust exerted axially on the butterfly valve 10, even though fluid pressure in the bore 14 may vary.

Attention is directed to the modification of the present invention illustrated in Fig. 2. This modification includes a multiple piston thrust compensating device which is adapted to exert a considerable thrust compensating force in proportion to the diameter of the piston cylinder thereof.

A butterfly valve shaft 66 of the modification is provided with a spherical thrust bearing end portion 68, engaged by a surface 70 of a piston 72 which is reciprocally mounted in a piston chamber 74 of a cylinder 76. The cylinder 76 is provided with an intermediate partition 78 located between the chamber 74 and another piston chamber 80 which is formed in the cylinder 76 and aligned with the chamber 74.

A second piston 82 is positioned in the chamber 80 and is secured to a piston rod 84 of the piston 72. This piston rod 84 extends through a reduced bore 86 in the partition 78, and rigidly interconnects the pistons 72 and 82.

Chamber section 88, between the partition 78 and the piston 72, communicates via passage 89 with a fluid conduit 90, which is similar to the conduit 54.

This conduit 90 also communicates with the bore 14 of the valve housing 16, as in the form of the invention shown in Fig. 1 of the drawings. The cylinder 76 is provided with a cap 92, having an inwardly directed stop portion 94 to prevent undue movement of the pistons 72 and 82. The section 96 of the piston chamber 80, between the cap 92 and the piston 82, also communicates with the conduit 90.

The chamber section 96 is disposed to receive pressure fluid through conduit 90, which tends to act on the piston 82. Section 98 of chamber 80, between the piston 82 and the partition 78, has a passage 100 communicating therewith. This passage 100 extends to and communicates with the bore 14 of the housing 16 at the downstream side 43 of the butterfly valve 10. The passage 100 prevents fluid pressure, in excess of the pressure at the downstream of the valve element, from building up in the chamber 98, due to any leakage from the chamber 96 around the piston 82.

The passage 100 is provided with a branch passage 101 to establish communication between the portion of chamber 88 adjacent the surface 70 of the piston 72 and the bore 14 at the downstream side 43 of the butterfly valve element 10.

Additionally, the shaft 66 is supported by a ball bearing 102, having openings therethrough which permit communication between the bore 14 and the portion of chamber 88 adjacent the surface 70 of the piston 72, thereby preventing pressures in excess of pressure at the downstream side 43 of the valve element from building up on said surface 70, due to a leakage of fluid pressure past the piston 72.

In operation, the modification shown in Fig. 2 of the drawings provides for high thrust compensating forces with a nominal diameter of the cylinder 76. This is due to the fact that both pistons 72 and 82 are acted upon by fluid pressure tending collectively to exert force on the thrust bearing 68 of the shaft 66. Thus, the thrust compensating device shown in Fig. 2 is very compact in proportion to the thrust compensating force it is capable of delivering.

A further modification of the invention is shown in Fig. 3 of the drawings. This thrust compensating device is arranged to compensate for thrust imposed by reversals of fluid pressure differentials acting on the butterfly valve element 10. This modification, as shown in Fig. 3, is capable of compensating for thrust imposed in either direction, axially of the pivotal axis of the butterfly valve 10, when pressure fluid tends to flow in the direction of the arrow 13 or in the opposite direction.

Referring specifically to Fig. 3, it will be seen that the thrust compensating device employs a cylinder 104, having a bore 106 in which a piston 108 is reciprocally mounted. The piston 108 is connected to a butterfly valve shaft 110 similar to the shaft 32 shown in Fig. 1 of the drawing. The shaft 110, however, has a disc-shaped coupling head 112 which is integral with a reduced diameter neck 114 of the shaft 110. Retainer plates 116 and 118 are provided with semicircular openings 117 and 119 respectively, disposed around said neck and having a radius nearly equal to that of the reduced diameter neck 114, whereby these plates overlie the head 112 of the shaft 110. The plates 116 and 118 are held securely on the piston 108 by means of bolts 120 and 122. Thus, the shaft 110 is fixed axially with respect to the piston 108, but is permitted to rotate relative thereto.

Supporting one end of the shaft 110 is a ball or other type of bearing 124, which will permit fluid to pass therethrough from section 126 of chamber 106 at the end of the piston 102 to the bore 14. In addition, a passage 136 in the housing 16 intercommunicates with the bore 14 and the chamber 126, whereby fluid pressure at the downstream side 43 of the valve 10 may communicate with the chamber 126 and piston 108 in the event the bearing 124 may be so constructed that it has no fluid passages therethrough.

A cap 128 closes one end of the bore 106 and forms one side of a chamber section 130 disposed to receive fluid pressure which acts on the piston 108 in opposition to that in the chamber section 126. The cap 128 is provided with an inwardly directed stop 132 disposed to prevent undue movement of the piston 108. A conduit 134 conducts fluid from the interior of the bore 14, at the upstream side 42 of the valve 10, into the chamber 130.

In accordance with the foregoing, it will be understood that the piston 108 is subjected to a pressure differential equal to that existing across the butterfly valve element 10. The head 112 of the shaft 110 is secured for movement with the piston 108 by the plates 116 and 118, and is disposed to transmit a force from the piston axially to the shaft 110 in either of two directions to compensate for thrust acting in alignment with the pivotal axis 40 of the butterfly valve 10. It will be noted that when fluid pressure acts in a direction opposite to that indicated by the arrow 13 in Figs. 1 and 3, the forces represented by vectors A, B and C in Fig. 4 are reversed.

Diaphragms are considered to be equivalent to pistons in construction of the various species of the present invention.

It will be obvious to those skilled in the art that the thrust compensating device of the present invention may be utilized on various butterfly valves, the pivotal axes of which are angularly disposed or inclined relative to opposite sides of the butterfly valve elements thereof. For example, the thrust compensating device of the present invention may readily be applied to axially inclined butterfly valve elements which are pivotally supported in a cantilever fashion.

I claim:

1. In a thrust compensating device for butterfly valves, the combination of: a valve housing having a flow conducting bore therein; a butterfly valve element with a surface exposed to inlet pressure when the valve is closed substantially normal to the axis of said bore, said valve being mounted in said bore for pivotal movement about an axis inclined relative to the axis of said bore; and fluid pressure responsive means communicating with fluid in said bore and disposed to exert force on said butterfly valve element in a direction longitudinally of its pivotal axis to compensate for thrust imposed axially thereon by fluid pressure in said bore acting on said butterfly valve element.

2. In a thrust compensating device for butterfly valves, the combination of: a valve housing having a flow conducting bore therein; a butterfly valve element with a surface exposed to inlet pressure when the valve is closed substantially normal to the axis of said bore, said valve element having a flexible rim at its periphery and being mounted in said bore for pivotal movement about an axis inclined relative to the axis of said bore; and fluid pressure responsive means communicating with fluid in said bore and disposed to exert force on said butterfly valve element in a direction longitudinally of its pivotal axis to compensate for thrust imposed axially thereon by fluid pressure in said bore acting on said butterfly valve element, whereby uneven peripheral loading of said flexible rim is substantially alleviated.

3. In a thrust compensating device for butterfly valves, the combination of: a valve housing having a flow conducting bore therein; a butterfly valve element mounted in said bore for pivotal movement about an axis inclined relative to that of said bore, said butterfly valve element having a surface substantially normal to the axis of said bore exposed to inlet pressure when said valve is closed; fluid pressure responsive means communicating with fluid in said bore and disposed to exert force on said butterfly valve element in a direction longitudinally of its pivotal axis to compensate for thrust imposed axially thereon by fluid pressure in said bore acting on said butterfly valve element, said fluid pressure responsive means comprising a plurality of axially aligned interconnected pressure responsive members; and means forming a separate pressure fluid receiving chamber for housing each of said pressure responsive members, said chambers communicating with the interior of said bore.

4. In a thrust compensating device for butterfly valves, the combination of: a valve housing having a flow conducting bore therein; a butterfly valve element with a surface substantially normal to the axis of said bore and exposed to inlet pressure when said valve is closed, said valve element being mounted in said bore for pivotal movement about an axis inclined relative to that of said bore; fluid pressure responsive means including a movable member and a housing therefor communicating with fluid in said bore and disposed to exert force on said butterfly valve element in a direction longitudinally of its pivotal axis to compensate for thrust imposed thereon by fluid pressure in said bore acting on said butterfly valve element; and coupling means interconnecting said pressure responsive means and said butterfly valve element, said coupling means being disposed to permit rotation of said butterfly valve element about its pivotal axis relative to said pressure responsive means and to positively fix the position of said pressure responsive means longitudinally of the pivotal axis of said butterfly valve element the movable member of said pressure responsive means having opposed surfaces communicating with said bore upstream and downstream respectively of said butterfly valve element, whereby said pressure responsive means is subjected to a pressure differential acting in a direction corresponding to the direction of a pressure differential concurrently acting on said butterfly valve element.

5. In a butterfly valve, the combination of: a valve housing having a fluid flow conducting bore therein; a generally disc-shaped butterfly valve element having opposed surfaces and disposed in said bore to control the flow of fluid therethrough; bearings supporting said butterfly valve element on a pivotal axis inclined, relative to said opposed surfaces, at an angle other than 90 degrees; a movable member disposed to exert force on said butterfly valve element in a direction longitudinally of its pivotal axis; and means communicating with said bore and disposed to apply fluid pressure to said movable member in a direction opposing the force exerted longitudinally of the pivotal axis of said butterfly valve element by fluid pressure in said bore acting on said butterfly valve element.

6. In a butterfly valve, the combination of: a valve housing having a fluid flow conducting bore therein; a generally disc-shaped butterfly valve element having opposed surfaces and disposed in said bore to control the flow of fluid therethrough; bearings supporting said butterfly valve element on a pivotal axis inclined, relative to said opposed surfaces, at an angle other than 90 degrees; a movable member disposed to exert force on said butterfly valve element in a direction longitudinally of its pivotal axis; means communicating with said bore and disposed to apply fluid pressure to said movable member in a direction opposing the force exerted longitudinally of the pivotal axis of said butterfly valve element by fluid pressure in said bore acting on said butterfly valve element, said movable member comprising a plurality of axially aligned interconnected pressure responsive members; and means forming a separate pressure fluid receiving chamber for housing each of said pressure responsive members.

7. In a butterfly valve, the combination of: a valve housing having a fluid flow conducting bore therein; a generally disc-shaped butterfly valve element having opposed surfaces and disposed in said bore to control the flow of fluid therethrough; bearings supporting said butterfly valve element on a pivotal axis inclined, relative to said opposed surfaces, at an angle other than 90 degrees; a movable member disposed to exert force on said butterfly valve element in a direction longitudinally of its pivotal axis; means communicating with said bore and disposed to apply fluid pressure to said movable member in a direction opposing the force exerted longitudinally of the pivotal axis of said butterfly valve element by fluid pressure in said bore acting on said butterfly valve element; and coupling means interconnecting said movable member and said butterfly valve element, said coupling means being disposed to permit rotation of said butterfly valve element about its pivotal axis, relative to said pressure responsive means, and to fix positively the position of said movable member longitudinally of the pivotal axis of said butterfly valve element.

8. In a thrust compensating device for butterfly valves, the combination of: a valve housing having a flow conducting bore therein; a butterfly valve element mounted in said bore for pivotal movement about an axis inclined relative to that of said bore, said butterfly element having a surface substantially normal to the axis of said bore exposed to inlet pressure when the valve is closed; and fluid pressure responsive means having a movable member and housing therefor disposed to exert force on said butterfly valve element in a direction longitudinally of its pivotal axis to compensate for thrust imposed axially thereon by fluid pressure in said bore acting on said butterfly valve element, the movable member of said pressure responsive means having opposed surfaces communicating with said bore upstream and downstream, respectively, of said butterfly valve element, whereby said pressure responsive means may be subjected to a pressure differential equal to that concurrently imposed upon said butterfly valve element.

9. In a thrust compensating device for butterfly valves, the combination of: a valve housing having a flow conducting bore therein; a butterfly valve element mounted in said bore for pivotal movement about an axis inclined relative to that of said bore, said valve element having a surface substantially normal to the axis of said bore and exposed to fluid pressure therein when the valve is closed; fluid pressure responsive means having a movable member and a housing therefor communicating with fluid in said bore and disposed to exert force on said butterfly valve element in a direction longitudinally of its pivotal axis to compensate for thrust imposed axially thereon by fluid pressure in said bore acting on said butterfly valve element; and thrust bearing means disposed to interconnect the movable member of said pressure responsive means with said butterfly valve element, and to permit said butterfly valve element pivotal freedom relative to said movable member.

10. In a thrust compensating device for butterfly valves, the combination of: a valve housing having a flow conducting bore therein; a butterfly valve element mounted in said bore for pivotal movement about an axis inclined relative to that of said bore, said butterfly valve element in its closed position having an inlet pressure engaged surface more nearly normal to the axis of said bore than said axis of pivotal movement; fluid pressure responsive means having a movable member and a housing therefor communicating with said bore and disposed to exert force on said butterfly valve element in a direction longitudinally of its pivotal axis to compensate for thrust imposed axially thereon by fluid pressure in said bore acting on said butterfly valve element; and swivel means disposed to connect the movable member of said pressure responsive means with said butterfly valve element and permit the latter to pivot relative to said movable member.

References Cited in the file of this patent

UNITED STATES PATENTS

| 1,671,069 | De Wein | May 22, 1928 |
| 2,058,996 | Kollberg | Oct. 27, 1936 |
| 2,816,729 | Jensen | Dec. 17, 1957 |
| 2,823,007 | Carr | Feb. 11, 1958 |

FOREIGN PATENTS

| 23,572 | Great Britain | of 1906 |